May 15, 1956 F. W. SEYBOLD 2,745,296
TRANSMISSION
Filed July 21, 1951 5 Sheets-Sheet 1
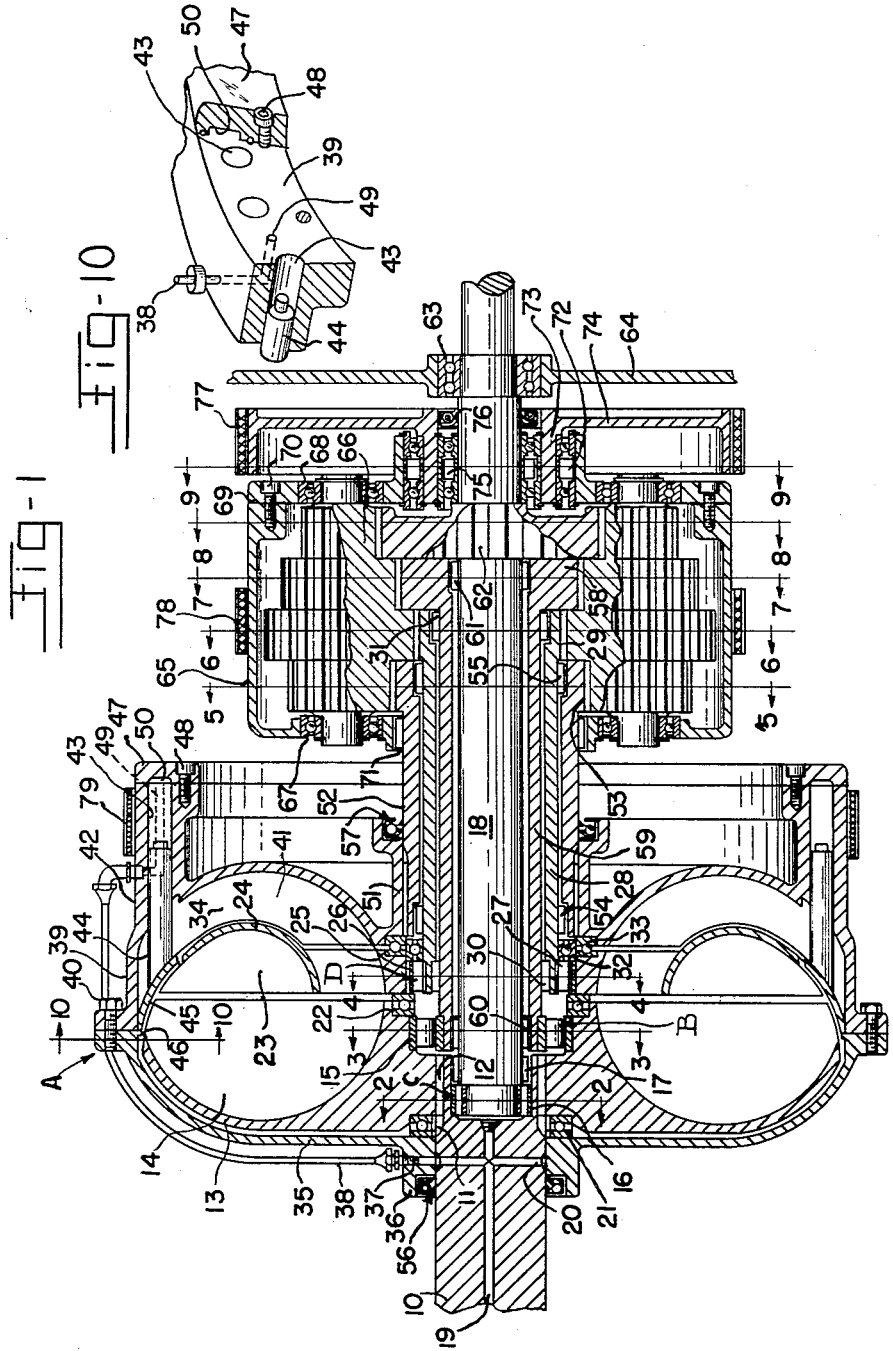
INVENTOR
FREDERICK W. SEYBOLD
BY Toulmin & Toulmin
ATTORNEYS

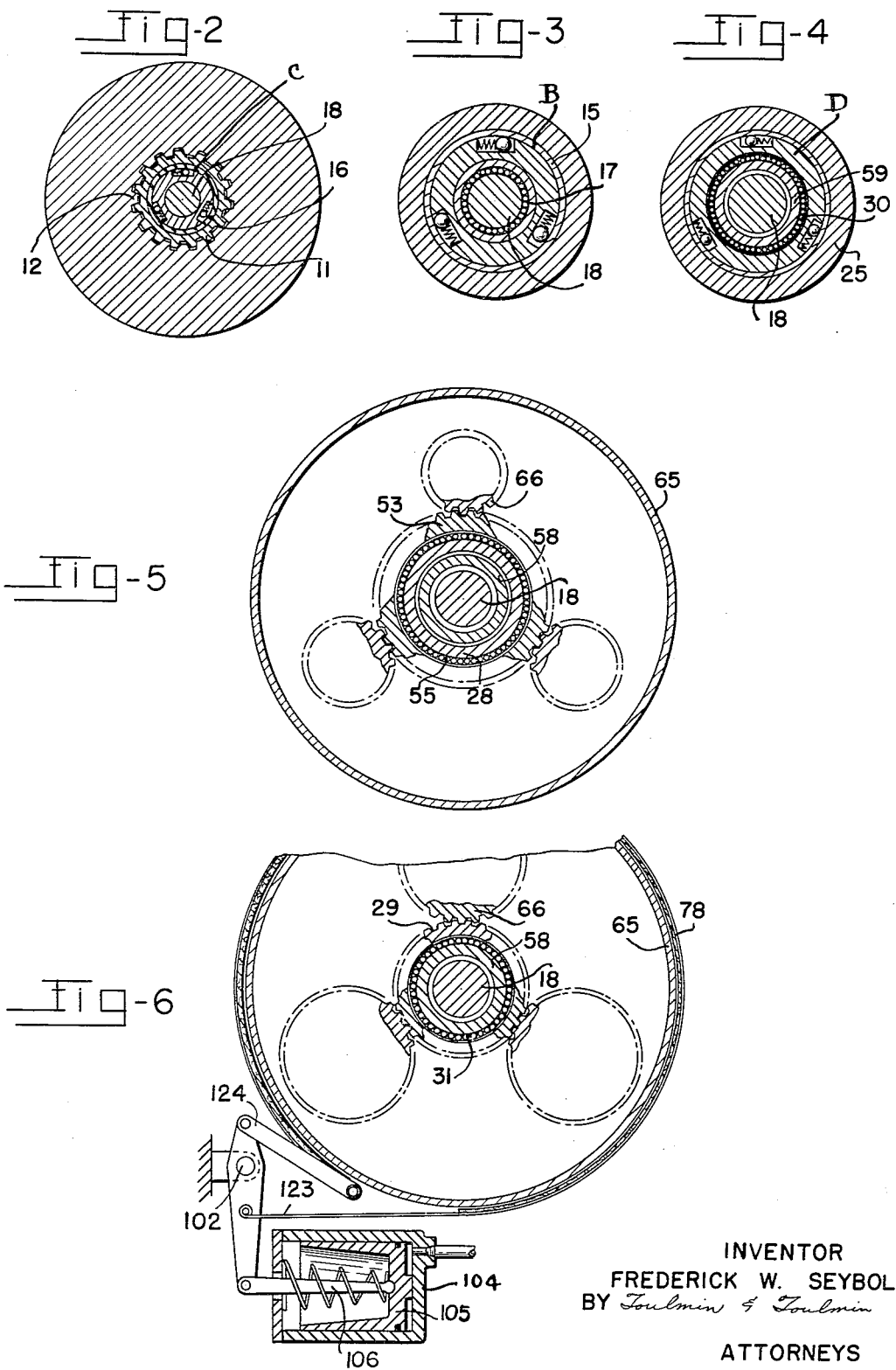

May 15, 1956     F. W. SEYBOLD     2,745,296
TRANSMISSION
Filed July 21, 1951     5 Sheets-Sheet 3
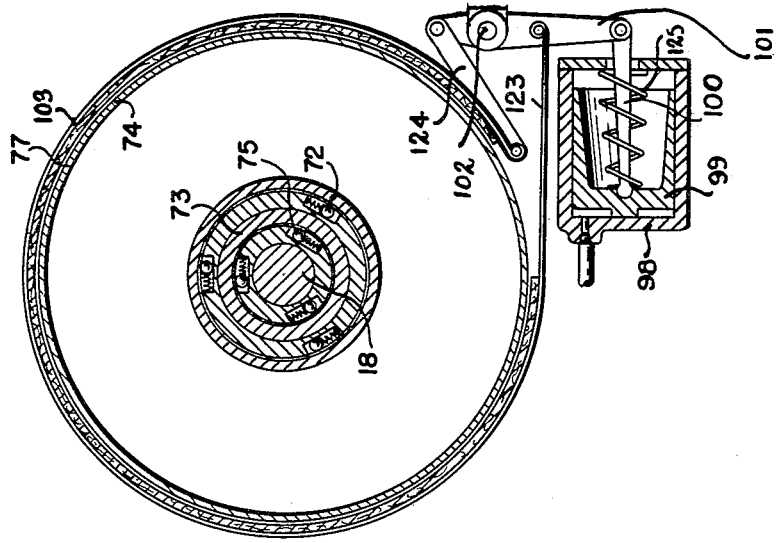
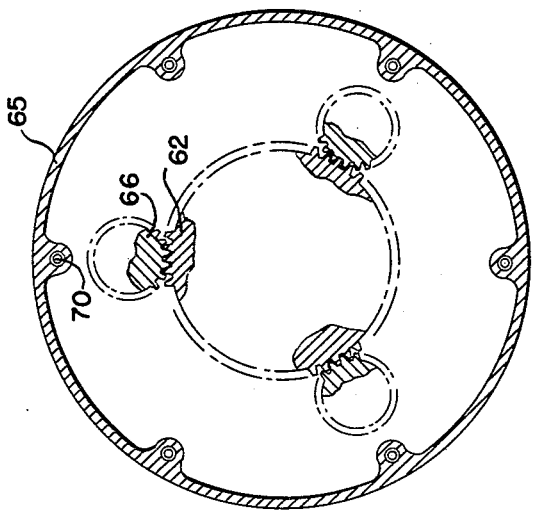
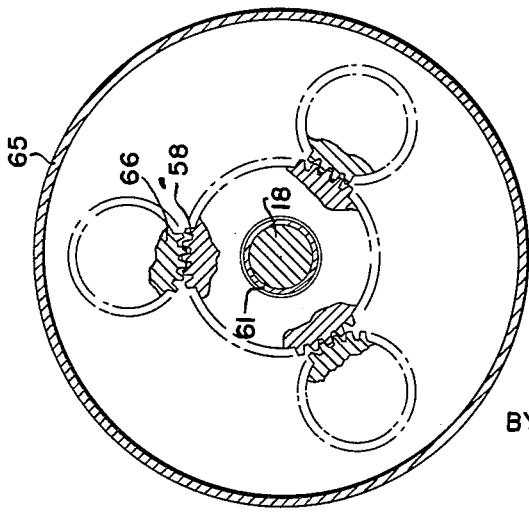
INVENTOR
FREDERICK W. SEYBOLD
BY Toulmin & Toulmin
ATTORNEYS

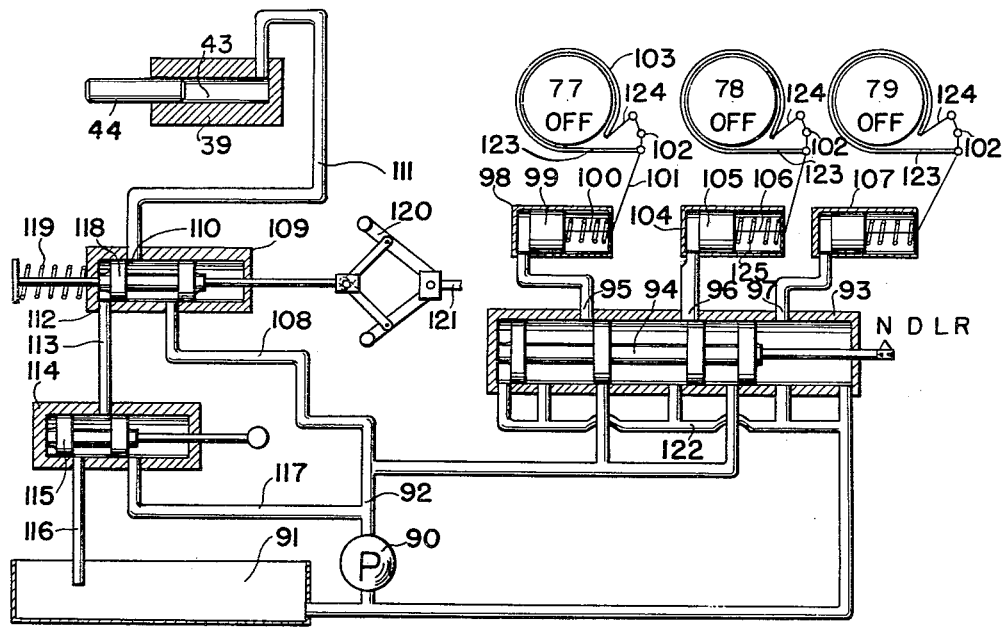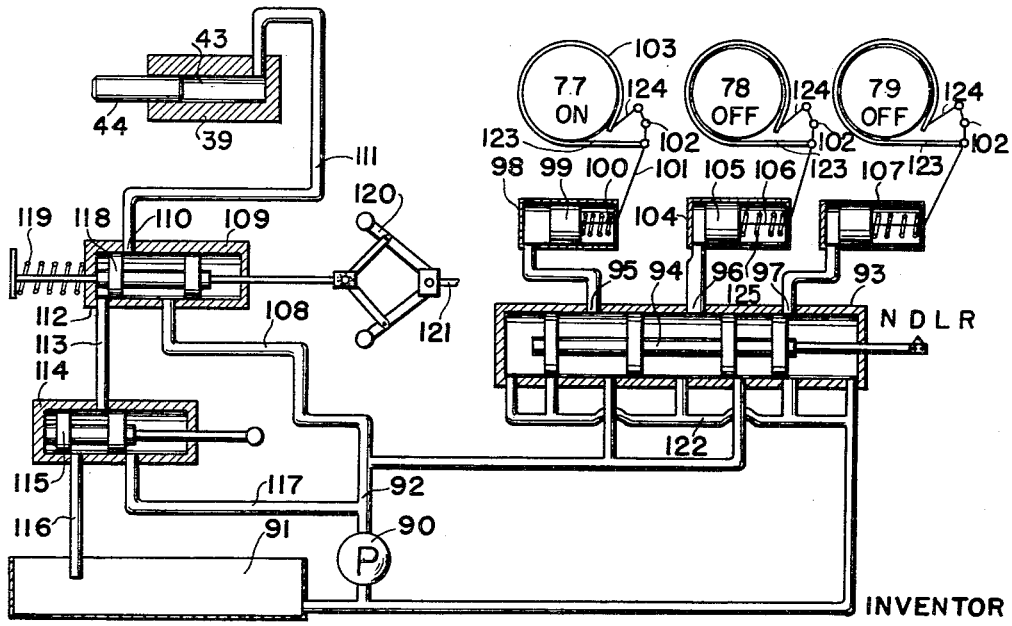

May 15, 1956  F. W. SEYBOLD  2,745,296
TRANSMISSION
Filed July 21, 1951  5 Sheets-Sheet 5
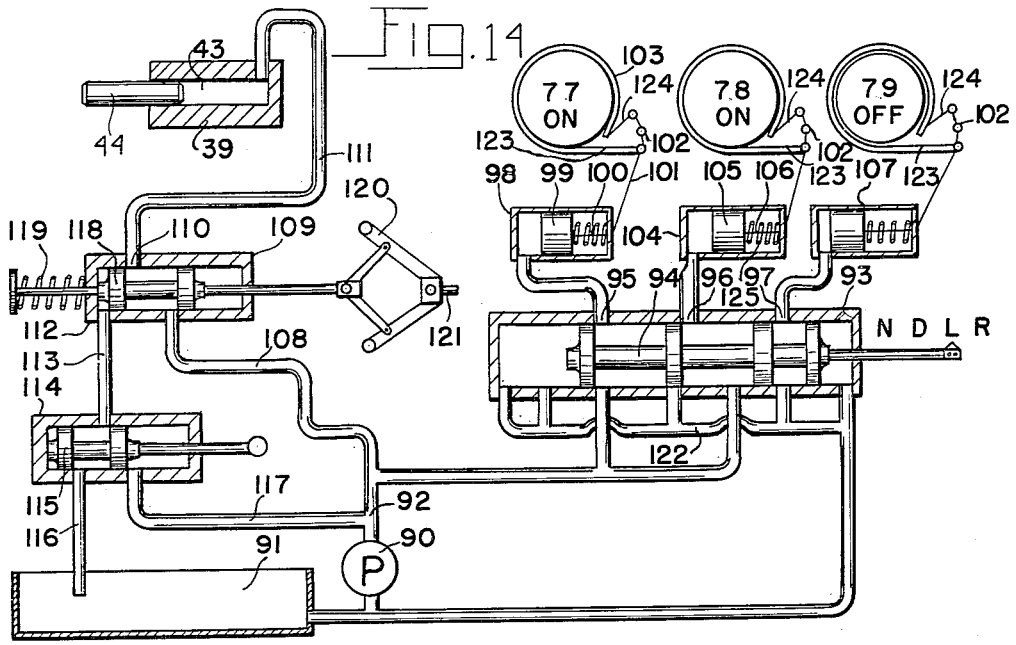
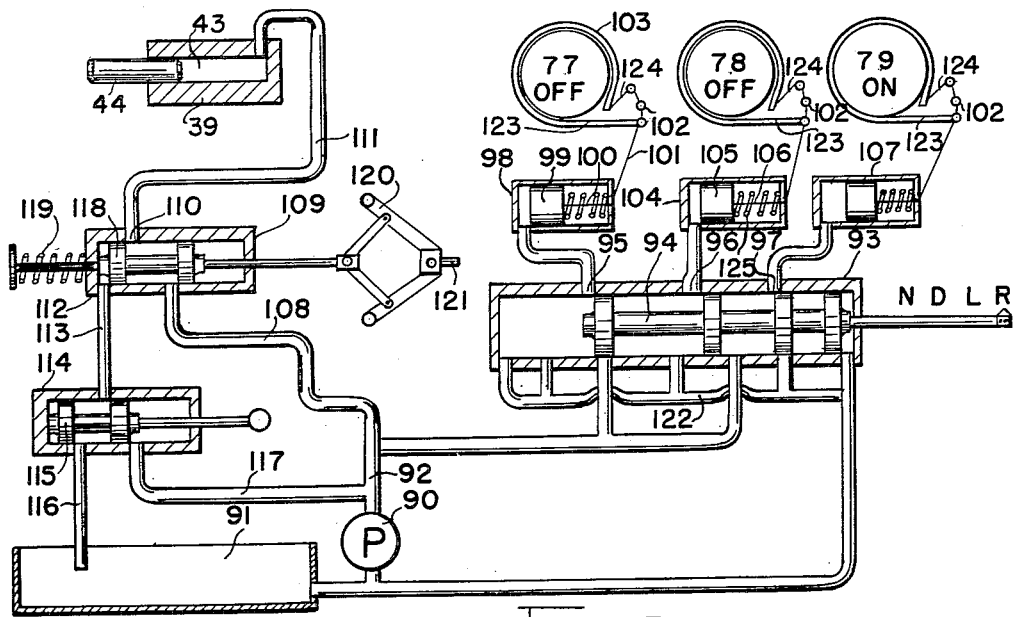
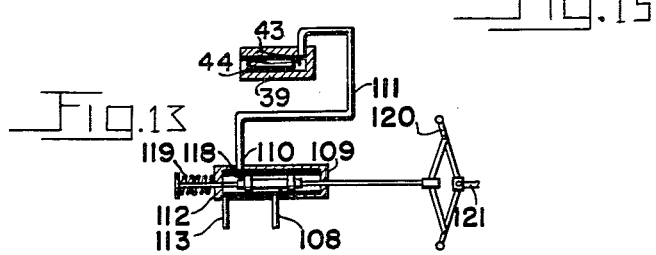
INVENTOR
FREDERICK W. SEYBOLD
BY Toulmin & Toulmin
ATTORNEYS United States Patent Office 2,745,296
Patented May 15, 1956

2,745,296

TRANSMISSION

Frederick W. Seybold, Westfield, N. J.

Application July 21, 1951, Serial No. 237,974

13 Claims. (Cl. 74—677)

This invention relates to automatic transmissions, and particularly to the combination of a fluid coupling and variable speed gearing for mounting between the power plant and the driven shaft of automotive vehicles such as passenger cars, trucks, and tanks, and for other power applications requiring variable speed.

Variable speed transmissions of the nature with which this invention is concerned, namely, the combination of a fluid drive unit and geared drive unit arranged in series, are well-known in the art and are rapidly becoming more or less standard equipment for passenger automobiles. The transmissions of this nature, however, that are currently being used, all have certain disadvantages in connection with either their construction, maintenance, or operation that cause them to be somewhat less satisfactory than is to be desired.

Most of the transmissions currently being employed utilize a plurality of clutches and brakes for effecting changes in the drive ratio of the transmission which are selectively opened and closed, either by a manual control device or by automatic control devices responsive either to the speed of the vehicle, to the throttle setting, or to a combination thereof.

Whenever the number of clutches and brakes in a transmission become numerous, the control system accordingly becomes complicated, and difficulties are encountered in keeping the control system in good working order. The largest part of the transmissions now being used commercially are so arranged that changes in speed ratio are effected by a combination of opening one or more clutches or brakes, while closing one or more other clutches and brakes. These clutches and brakes are generally independent units and are essentially independently controlled, and are, therefore, quite difficult to synchronize so that the net result is that when a change in the speed range takes place, there is generally a perceptible shock in the drive train between the power plant and the output shaft which comes about because of an overlap in the operation of the clutches or brakes or an interval therebetween.

Having the foregoing in mind, it is a primary object of the present invention to provide a variable speed transmission of extreme simplicity, thereby avoiding the difficulties referred to above.

It is also an object of this invention to provide a power transmission having a full range of forward and reverse speeds.

A still further object of this invention is to provide a power transmission in which the progressive gear ratio transitions are made in a smooth and imperceptible manner.

A particular object of this invention is to provide a power transmission having multiple speed ranges in which timed or overlapped shifting of clutches or brakes is eliminated.

A still further object of this invention is the provision of a new type of fluid coupling having multiple runners which are so controlled that at least a part of the change from one gear ratio to another is effected within the fluid coupling.

Another object is to provide a multi-range power transmission having a geared unit and a fluid coupling unit interconnected in which at least some of the speed changes of the transmission are effected within the fluid coupling, and wherein the control of these changes is effected externally of the coupling.

Another object of this invention is to provide a power transmission in which no additional gear sets are required for reverse operation, so that only one set of gears are required.

These and other objects and advantages will become more apparent upon reference to the following description taken in connection with the accompanying drawings, in which:

Figure 1 is a vertical longitudinal section through a power transmission constructed according to my invention;

Figure 2 is a transverse section taken on line 2—2 of Figure 1 showing an overrunning clutch which prevents the output shaft from overrunning the input shaft, whereby engine braking is available and the engine can be started by a taxi push of the vehicle;

Figure 3 is a transverse section indicated by line 3—3 on Figure 1 showing an overrunning clutch positioned between the impeller of the fluid coupling and one of the elements of the gear unit of the transmission;

Figure 4 is a transverse section indicated by line 4—4 on Figure 1 and showing an overrunning clutch that is positioned between one of the runners of the fluid coupling and its driven member.

Figure 5 is a transverse section indicated by line 5—5 on Figure 1 showing one of the stages of the gear units;

Figure 6 is a transverse section indicated by line 6—6 on Figure 1 showing another stage of the gear unit and the brake band arrangement for halting rotation of the housing in which the cluster gear sets are mounted;

Figures 7 and 8 are transverse sections indicated by lines 7—7 and 8—8, respectively, on Figure 7, showing different stages in the gear unit;

Figure 9 is a transverse section indicated by line 9—9 on Figure 1 showing a reaction member and the brake band for locking the reaction member up and the overrunning clutches associated with the reaction member;

Figure 10 is a fragmentary perspective view partly in cross-section showing a portion of the fluid coupling of Figure 1;

Figure 11 is a diagrammatic view illustrating the control circuit for the transmission with all parts in the position they occupy when the transmission is in neutral;

Figure 12 is a view like Figure 11 showing the parts of the control system in drive position;

Figure 13 is a fragmentary view showing how a centrifugally controlled valve of the control system shifts at a predetermined speed;

Figure 14 is a view like Figure 11 but showing the control system in low drive ratio; and Figure 15 is a view like Figure 11 showing the control system in reverse position.

GENERAL ARRANGEMENT

In general the transmission of this invention comprises the combination of a fluid coupling having an impeller and two runners and a geared unit. The impeller and runners are arranged so that below a predetermined speed of operation the impeller is coupled with only the inner of the runners and above a predetermined speed the impeller is coupled with the outer of the runners, with the inner runner idling.

The geared unit that is provided comprises a casing having therein two or more cluster gears, each consisting of a plurality of pinions. A pair of sun gears are provided meshing with certain of the pinions, and these sun gears are connected with the runners of the fluid coupling, with the sun gear associated with the inner one of the runners being connected therewith through an overrunning clutch.

Another of the pinions of the cluster gears meshes with a gear on the output shaft of the transmission. Means are provided for holding the casing which mounts the cluster gears against rotation to give a driving connection between the runner driven sun gears and the output gear, and this means includes an overrunning clutch that permits rotation of the casing for obtaining a high gear ratio.

Still another of the pinions of the cluster gears meshes with a sun gear that has an overrunning clutch between it and the impeller of the fluid coupling, so that, when this last-mentioned sun gear reaches the speed of the fluid coupling impeller, it is locked thereto and provides for an increase in the driving ratio of the transmission.

An auxiliary braking means is provided for locking the housing containing the cluster gears against rotation in either direction, whereby the transmission can be locked in low gear for coasting down hills.

Still another braking means is provided for locking one of the runner driven sun gears against rotation, whereby the transmission can be operated in reverse.

STRUCTURAL ARRANGEMENT

The transmission according to my invention can advantageously be considered by dividing it into eight sub-assemblies, which will now be taken up in order.

1. *The driving assembly*

The driving assembly comprises the drive shaft 10 which is provided with external multiple splines 11 for mating with the internal multiple splines 12 of the impeller 13 of a three-element hydraulic coupling designated by A. The impeller 13 is provided with radial vanes 14 and carries the outer member 15 of an overrunning clutch B, shown in Figure 3. The drive shaft 10 is recessed to receive the outer member 16 of the overrunning clutch C and the anti-friction bearing 17, which supports the output or driven shaft 18. The drive shaft 10 is also provided with passages 19 and 20 for the purpose of conducting pressure oil. The impeller 13 is also recessed for the reception of the thrust bearings 21 and 22 to keep the impeller in correct operating relationship with the other members of the coupling A.

2. *The primary floating assembly*

The primary floating assembly consists of the runner 23 which is composed of the toroidal shell 24 and the hub portion 25, into which is fitted the outer member 26 of an overrunning clutch D, shown in Figure 4. Radial vanes 27 connect the shell 24 and the hub 25. The inner member of the overrunning clutch D is secured to the long sleeve 28 of the driving pinion 29, which is recessed on both ends to receive anti-friction bearings 30 and 31. The hub 25 is also recessed to receive the ball bearings 32 and 33 to provide for radial support and end thrust of the runner 23, respectively.

3. *The secondary floating assembly*

The secondary floating assembly consists of the runner 34, which is composed of three sections. The left-hand section 35 conforms closely to the shape of the impeller 13, and its hub 36 is journalled on the drive shaft 10 and is provided with suitable ports 37 to cooperate with the passages 20 to conduct pressure oil from the hub 36 through the oil pipe 38 to the center section 39 of the runner 34. The left hand section 35 is fastened to the center section 39 by a series of screws 40. The runner 34 is provided with radial vanes 41 and an annular extension 42.

Centrally between each pair of vanes and in said annular extension cylindrical bores 43 are provided and into which closely fitted pistons 44 are inserted. Blades 45 are integral with the pistons 44 and are slidably fitted between the vanes 41, and their contour is such as to provide a smooth path to the circulating oil in the coupling. A protrusion 46 on the left-hand section of the runner 35 acts as limiting stop for the blades 45 in their most extended position, in which these blades align with the contour of the toroidal shell 24 and prevent any circulating oil from entering between the vanes 41 of the runner 34.

The third or right-hand section of the runner 34 is the recessed ring 47 which is fastened to the center section 39 by the screws 48. A series of ports 49 conduct the pressure oil which enters from the piping 38 into the recess 50, whereby said oil may readily enter the bores 43 and act on the pistons 44 therein. Likewise when the oil pressure is relieved and the centrifugal force of the circulating oil pushes on the blades 45, the pistons 44 will move to the right and then permit access of the circulating oil in the coupling to the vanes 41 of the runner 34.

The center section 39 has a multiple splined hub 51 which mates with the long sleeve 52 of the pinion 53 which is recessed to receive anti-friction bearings 54 and 55 which are journalled on the long sleeve 28 of the driving pinion 29. Oil seals 56 and 57 are provided to prevent oil leakage.

4. *Direct drive or high ratio assembly*

The direct drive or high ratio assembly consists of the pinion 58 which has a long sleeve portion 59 and is recessed for the reception of anti-friction bearings 60 and 61, which are journalled on the driven shaft 18. The inner portion of the overrunning clutch B is secured to the long sleeve 59 and cooperates with the outer portion which is secured to the impeller 13, so that the pinion 58 cannot overrun the impeller 13. The bearings 30 and 31 of the pinion 29 are also journalled on the long sleeve 59 of the pinion 58.

5. *The driven assembly*

The driven assembly consists of the long driven shaft 18, whose left-hand end is reduced to have secured to it the inner member of the overrunning clutch C which prevents the shaft 18 from overrunning the drive shaft 10, also for "taxi-push" starting of the engine by pushing the car.

To the right of pinion 58 a pinion 62 is secured to the shaft 18 and the right-hand end of the latter is journalled in the ball bearing 63 mounted in the transmission housing 64.

6. *The reaction assembly*

The reaction assembly consists of the rotatable housing 65 in which two or more cluster pinions 66 are mounted on anti-friction bearings 67 and 68. For assembly reasons the housing 65 has a detachable end 69 which is fastened to the housing 65 by the screws 70. The cluster pinions 66 are of suitable proportion, and they mesh, respectively, with the pinions 53, 29, 58 and 62, so that the desired speed ratios are obtained.

Let us assume that the pinion 53 has 48 teeth and its cluster pinion 24 teeth, and pinion 29 and its cluster pinion each have 36 teeth, and pinion 58 has 45 teeth, then its cluster pinion mate will have 27 teeth, the pinion 62 has 54 teeth, then its cluster pinion mate will have 18 teeth.

It is a prerequisite that the sum of the teeth in each gear set be the same, or, in other words, the center distance of each gear set must be the same, if the teeth are straight in all of the four gear sets. In case the teeth are helical, the various gear sets need only have the same center distance for their correct operation.

An anti-friction bearing 71 journals the housing 65 on the sleeve 52 of the pinion 53, and a combination ball bearing and overrunning clutch 72 journals the housing 65 on the hub 73 of the brake wheel 74, the latter being journalled by the combination ball and overrunning clutch 75 on the driven shaft 18.

An oil seal 76 is mounted in the hub 73 of the brake wheel 74 to prevent oil leakage.

7. *The control assembly*

The control assembly comprises a source of pressure oil usually secured from a gear pump driven by the engine and which, when controlled by a suitable manually or automatically operated valve can be applied to the actuating pistons of the control mechanism.

The fluid supply to pistons 44 is preferably controlled by a governor operated valve, which, when the vehicle has attained a certain definite speed, will shift and relieve the oil pressure in the bores 43, so that the pistons may recede from their extended position and permit entry of the circulating oil in the coupling to the vanes 41 of the runner 34. Under certain driving conditions, it may be desirable to overrule the governor operated valve and continue the setting of the transmission in the lower speed ratio, which may be accomplished by manual actuation of said valve or by-passing of the valve.

A brake band 77 for braking the brake wheel 74 is actuated by well-known means, such as a fluid operated piston acting on the free end of a brake band, whereby the rotation of the reaction assembly in a direction opposite to that of the drive shaft is prevented; but the overrunning clutch 72 will permit the rotation of the reaction assembly in the same direction as that of the driven shaft 18.

A brake band 78, when applied to the housing 65, will prevent its rotation in either direction and is mostly used for hill braking or heavy, long pulls in low gear ratio.

A brake band 79 when applied to the annular extension 42 will brake the runner 34 and pinion 53 for reverse operation of the transmission.

8. *The no-roll-back assembly*

To prevent the vehicle from rolling backward when it has stopped on an incline and the setting of the transmission is for forward operation the overrunning clutch 75 is provided between the driven shaft 18 and the brake wheel 74. This clutch 75 prevents the driven shaft 18 from rotating backwards as long as the brake wheel 74 is held by the brake band 77 and, of course, does not interfere with the forward rotation of the said shaft 18.

When the transmission is conditioned for reverse operation, the brake 77 is released and allows reverse rotation of brake wheel 74, as well as that of the reaction assembly when the brake band 79 is applied.

The control assembly, referred to above, and which includes the several bands that lock up the various parts of the transmission and the plungers 44, which actuate the deflectors 45, includes valve mechanism which will be seen in Figures 11 through 15. In these figures the pump that operates pressure fluid for actuating the bands is indicated at 90 and draws fluid from a reservoir 91 to discharge it into a pressure conduit 92. The pressure conduit leads to a control valve casing 93, having therein the reciprocable valve member 94.

Casing 93 is provided with a plurality of service ports 95, 96, and 97. Port 95 is connected with cylinder 98, having therein piston 99 connected with rod 100 that is pivotally secured to one end of a lever 101 that is pivoted at 102.

A connection on one side of pivot 102 is made with resilient outer band 103 of brake band 77 and a connection below the said pivot is made with the opposite end of the resilient band 103. This arrangement will be seen more in detail in Figure 9, wherein it will be observed that a tension element 123 effects the one connection of the resilient band with lever 102 and a compression element 124 effects the other connection. The arrangement is such that a small angular movement of the arm will bring about quick application of the brake band to the drum and, likewise, a small movement of the arm in the opposite direction will provide clearance between the band and the drum.

The actuating piston 99 is preferably urged in its band opening direction by a spring 125, so that pressure fluid need be supplied to cylinder 98 only for applying the band.

Similarly associated with band 78 which locks casing 65 when energized is a cylinder 104 having therein a piston 105 connected by rod 106 with the actuating means for the band, this means being the same as that described in connection with band 77. Cylinder 104 is connected to receive pressure fluid from port 96 of the control valve.

Port 97 of the valve is similarly connected with cylinder 107 pertaining to the actuating mechanism for band 79 that locks up the outer runner of the fluid coupling and its associated pinion when energized.

Pump 90 also discharges pressure fluid through a conduit 108 to a port in casing 109 of the governor controlled valve that has a service port 110 connected by conduit 111 with the cylinders in which pistons 44 are mounted.

Casing 109 has another port at 112 connected by conduit 113 with a port in casing 114 of a manual control valve. The manual control valve has a valve member 115 adapted for manual actuation between a normal position where conduit 113 is connected with exhaust conduit 116 and a second position where conduit 113 is connected with pressure conduit 117 leading to the discharge side of pump 90.

The governor control valve also has a valve member 118 normally urged by a spring 119 in a position to interconnect conduits 108 and 111. A governor, such as the fly ball mechanism indicated at 120, is connected for being driven as by the shaft 121 and at a predetermined speed of rotation will move valve member 118 into position to interconnect conduits 111 and 113. Shaft 121 may be engine driven or may be driven at a speed corresponding to the speed of the vehicle, or other load being powered by the transmission.

Valve member 94 of the control valve for the bands 77, 78, and 79 has four positions into which it can selectively be adjusted manually. This is preferably done by means of a shift lever in the steering column or by any other suitable arrangement that will be convenient for the operator.

In its first position, identified by letter "N," which is neutral, all of ports 95, 96, and 97 are connected with the exhaust manifold 122 that leads back to reservoir 91. This position of the parts of the control system is illustrated in Figure 11.

The next position of the valve member 94 is shown in Figure 12, where the member is moved to "D" position, and with the valve so shifted that pressure fluid is delivered to port 95 pertaining to band 77 so that the said band is energized, while the other bands 78 and 79 remain de-energized.

The transmission is now in drive ratio, and at a predetermined speed the governor valve shifts to the position illustrated in Figure 13, and this permits deflectors 45 and their pistons 44 to move to a position where fluid will be admitted to the outer runner.

The third position for valve member 94 is marked "L," and in this position both bands 77 and 78 are energized by a supply of pressure fluid to their ports 95 and 96. With the valve in this position, housing 65 of the cluster gears is locked and the transmissions forced to operate in low gear, thus providing a safety factor for coasting down long hills.

The last position that the valve member 94 can occupy is identified "R," and is illustrated in Figure 15. This is the position for reverse operation of the transmission, and at that time port 97 for band 79 receives pressure fluid, while ports 95 and 96 of the other bands are connected to exhaust.

At this time the governor valve is shifted to its Figure 11 position so that only the inner runner is effective. In certain instances it might be desirable to provide an arrangement for automatically forcing plungers 44 and deflectors 45 outwardly whenever band 79 is energized. This could readily be accomplished by providing a pilot arrangement on the overruling valve, which would shift its valve member 115 to overruling position whenever port 97 of band 79 was subjected to pressure.

OPERATION

Idling or "neutral" position

For "neutral" operation of the transmission, a suitable control lever on the steering wheel post will be set into the "neutral" position, whereby the control valve will be set so that all three brake bands are released, but pressure oil will be applied to the pistons 44 so that the blades 45 will be held against the stops 46.

The driven shaft 18 is now stationary and with the gear ratios as stated above, and with the runner 23 and pinion 29 turning with the impeller 13, the reaction assembly will turn in the opposite direction at half the speed of the runner 23, and the runner 34 and pinion 53 will turn in the same direction at one-fourth the speed of the runner 23, and the pinion 58 also turns in the same direction, but at two-fifths the speed of the runner 23.

Forward motion in "low" gear

To produce forward motion in "low" gear, the control lever is shifted into the "drive" position, whereby the valve is set to deliver pressure oil to the brake cylinder which applies pressure to the free end of the brake band 77 to stop the reaction member from rotating backwards and cause the runners 23 and 34 to come to a stop because the output shaft 18 is still stationary, due to the application of the foot or parking brake.

Upon release of the brake and depression of the accelerator, the runner 23 will speed up, and through pinion 29, cluster gears and pinion 62 will drive the output shaft 18 at reduced speed but increased torque. As previously assumed, the pinion 29 and its mating cluster pinion have each 36 teeth, the output shaft pinion 62 has 54 teeth, and its cluster pinion mate has 18 teeth. Therefore, when the housing 65 is at rest, the shaft 18 turns at one-third the speed of the runner 23, but its torque is three times as great.

The speed of the runner 34 is now half the speed of the runner 23, and the pinion 58 turns at three-fifths the speed of the runner 23.

Forward motion in "intermediate" gear

As the car speed increases to, say, approximately ten miles per hour, the governor will shift the valve into the position whereby the oil pressure is relieved in the pipe lines 19, 20, 38, 49, and so that the centrifugal force of the circulating oil in the coupling will push on the blades 45 and force the pistons 44 to the right and permit entrance of the circulating oil into the vanes 41 of the runner 34, which will accelerate its speed and the drive will now be taken over by the pinion 53 and the runner 23 will idle along with the impeller 13, but the pinion 29 will turn faster, and this is accommodated by the overrunning clutch "D."

The pinion 58 being smaller in size than pinion 53, also rotates faster, so that when the runner 34 and pinion 53 rotate at five-sixth engine speed, the pinion 58 will rotate at engine speed.

The speed of the output shaft 18 will then be five-ninths that of the engine, but its torque will be one and one-half times that of the input shaft 10.

Forward motion in "high" gear

The overrunning clutch B will prevent the pinion 58 from turning faster than the input shaft 10, so that when the pinion 53 turns at a speed in excess of five-sixths engine speed, the cluster pinion housing will be compelled to turn in the same direction as the input shaft 10, this being permitted by the overrunning clutch 72 without releasing the brake band 77, and, as a result, the output shaft speed will be increased.

As the speed of the runner 34 approaches the speed of the impeller 13, the speed of the output shaft 18 also increases. For example, if the runner 34 has two per cent slip, the speed of the output shaft 18 will be ninety-four and two-thirds per cent of the input shaft speed for the gear proportions stated above.

It should also be noted that the torque capacity of the hydraulic coupling must be two and two-thirds times the maximum engine torque because the pinion 58 "feeds back" a large portion of the "circulating" torque of the coupling, i. e., if the engine torque is taken as unity, then the pinion 58 "feeds back" one and two-thirds times engine torque to the impeller 13, where it is added to the engine torque.

Therefore, two and two-thirds engine torque is transmitted to the runner 34 and pinion 53. The latter delivers through the cluster pinions unity engine torque to pinion 62 on the output shaft 18 and one and two-thirds engine torque to pinion 58, which "feeds" it back through the overrunning clutch B to the impeller 13.

When the speed of the car is reduced, due to increased torque demand, the cluster pinion housing 65 will come to a halt and its counter rotation will be prevented by the overrunning clutch 72, and the brake band 77, which is continuously applied as long as the transmission is conditioned in the "drive" position, and then torque multiplication again takes place.

Down-hill braking

When descending steep hills, the car could attain excessive speed, unless the brakes are applied, because there is no direct mechanicial connection between the output and input shafts and the cluster pinion housing 65 cannot be held by the brake 77 in the forward rotation.

For these reasons the brake band 78 is provided which is capable of stopping the rotation of said housing and compelling the transmission to operate in the low gear ratio where the engine can be effective in braking the car.

Reverse operation

To produce "reverse" operation of the transmission, the control lever is moved to the "reverse" position. The brake band 79 will be applied, and the brake bands 77 and 78 will be free, pressure oil being delivered into its brake cylinder, stopping the rotation of the runner 34 and pinion 53. Pressure oil will also force the pistons 44 with the vanes 45 to the left against the stops 46.

When the engine is speeded up, the runner 23 will be accelerated and pinion 29 will cause the housing 65 with its cluster pinions to planetate around the now stationary pinion 53 at the same speed, but in the opposite direction from that of the driving pinion 29. The output shaft 18 will now turn in "reverse" at one-third the speed of the pinion 29 and the output torque is now three times that of the input shaft.

The "no-roll-back" overrunning device 75 is automatically rendered ineffective because the housing 65 turns three times faster in the same direction as the output shaft 18.

From the foregoing, it will be seen that my invention provides for an automatic transmission having multiple speed ranges which makes it suitable for passenger type automotive vehicles and the like, which is of extreme simplicity, and in which all timed and overlapped shifting of clutches and brakes is eliminated.

The net result is a transmission that can be produced economically, serviced easily, and in which the changes from one speed ratio to another take place without any perceptible shock in the drive train.

9

It will be understood that I do not wish to be limited to the exact proportions, ratios, and other factors specifically set forth in the foregoing description and the accompanying drawings, but desire to comprehend such changes thereof as may be further desirable to adapt my invention to different conditions and usages.

I claim:

1. In a transmission having driving and driven shafts: a pair of intermediate shafts arranged in telescoping relation with each other and with said driven shaft, sun gears of respectively different sizes on said intermediate and driven shafts, cluster planet gear means meshing with said sun gears, a frame rotatable on the axis of said shafts and rotatably supporting said cluster planet gear means, means for coupling said driving shaft first with the one of said intermediate shafts having the smaller sun gear thereon and then with the other of said intermediate shafts having the larger sun gear thereon, brake means selectively engageable for holding said frame against rotation in one direction, an overrunning clutch between said frame and brake means for permitting rotation of said frame in a direction opposite to the said one direction, a direct drive sun gear of a size intermediate the sun gears on said intermediate shafts and a pinion integral with said cluster planet gear means and meshing with said direct drive sun gear, and means for preventing said direct drive sun gear from rotating at a speed above that of said driving shaft.

2. In a transmission having driving and driven shafts: a pair of intermediate shafts arranged in telescoping relation and coaxial with said driven shaft, sun gears of different sizes on said intermediate shafts and a sun gear larger than the largest one of said intermediate shafts on said driven shaft, cluster planet gear means meshing with said sun gears, a frame supporting said cluster planet gear means, a member interposed between said frame and said driven shaft, overrunning clutch means between the frame and member and between the member and the driven shaft, brake means for selectively locking said member against rotation in either direction, drive means for coupling the driving shaft first with the one of said intermediate shafts having the smaller sun gear thereon and then with the other of said intermediate shafts having the larger of said sun gears thereon, a direct drive sun gear intermediate the size of those on said intermediate shafts and a pinion integral with said cluster planet gear means and meshing with said direct drive sun gear, and an overrunning clutch between said direct drive sun gear and said driving shaft to prevent the direct drive sun gear from rotating at a speed faster than said driving shaft.

3. In combination in a transmission having driving and driven shafts, an intermediate shaft, a sun gear on said intermediate shaft, a larger sun gear on said driven shaft, cluster planet gear means meshing with said sun gears, a frame supporting said cluster planet gear means, a brake for holding said frame against rotation in one direction, a fluid coupling having an impeller connected with said driving shaft and a runner connected with said intermediate shaft, a direct drive sun gear smaller in size than the sun gear on said intermediate shaft and a pinion integral with said cluster planet gear means and meshing with said direct drive sun gear, and means for preventing said direct drive sun gear from overrunning said driving shaft, said means transmitting torque in one direction only from said direct drive sun gear to said driving shaft.

4. In combination in a transmission having driving and driven shafts, an intermediate shaft, a sun gear on said intermediate shaft, a larger sun gear on said driven shaft, cluster planet gear means meshing with said sun gears, a frame supporting said cluster planet gear means, a brake for holding said frame against rotation in one direction, a fluid coupling having an impeller connected with said driving shaft and a runner connected with said intermediate shaft, a direct drive sun gear smaller in size than the sun gear on said intermediate shaft a pinion integral with said cluster planet gear means and meshing with said direct drive sun gear, and means for preventing said direct drive sun gear from overrunning said driving shaft, said means transmitting torque in one direction only from said direct drive sun gear to said driving shaft and comprising an overrunning clutch interposed between said driving shaft and said direct drive sun gear.

5. In combination in a transmission having driving and driven shafts, an intermediate shaft, a sun gear on said intermediate shaft and a larger sun gear on said driven shaft, said shafts being coaxial, cluster planet gear means meshing with said sun gears, a frame rotatable on the axis of said shafts and rotatably supporting said cluster planet gear means, brake means, an overrunning clutch between said brake means and frame for permitting rotation of said frame in the direction of rotation of said driving shaft, while preventing rotation thereof in the opposite direction, a fluid coupling having an impeller connected with the driving shaft and a runner connected with said intermediate shaft, a direct drive sun gear smaller than the sun gear on said intermediate shaft, said cluster planet gear means including a pinion meshing with said direct drive sun gear, and an overrunning clutch between said direct drive sun gear and driving shaft for preventing said direct drive sun gear from rotating faster than said driving shaft, said overrunning clutch transmitting torque in one direction only from said direct drive sun gear to said driving shaft.

6. In combination in a transmission having driving and driven shafts, an intermediate shaft, a sun gear on said intermediate shaft and a larger sun gear on said driven shaft, said shafts being coaxial, cluster planet gear means meshing with said sun gears, a frame rotatable on the axis of said shafts and rotatably supporting said cluster planet gear means, brake means, an overrunning clutch between said brake means and frame for permitting rotation of said frame in the forward direction of rotation of said driven shaft, while preventing rotation thereof in the opposite direction, a fluid coupling having an impeller connected with the driving shaft and a runner connected with said intermediate shaft, a direct drive sun gear smaller than the sun gear on said intermediate shaft, a pinion integral with said cluster planet gear means meshing with said direct drive sun gear, and an overrunning clutch between said direct drive sun gear and driving shaft for preventing said direct drive sun gear from rotating faster than said driving shaft, there also being an overrunning clutch between said driven shaft and said brake means permitting rotation of said driven shaft in its forward direction, but preventing rotation thereof in the opposite direction when said brake means is actuated.

7. In combination in a transmission having driving and driven shafts, an intermediate shaft, a sun gear on said intermediate shaft and a larger sun gear on said driven shaft, said shafts being coaxial, cluster planet gear means meshing with said sun gears, a frame rotatable on the axis of said shafts and rotatably supporting said cluster planet gear means, brake means, an overrunning clutch between said brake means and frame for permitting rotation of said frame in the forward direction of rotation of said driven shaft, while preventing rotation thereof in the opposite direction, a fluid coupling having an impeller connected with the driving shaft and a runner connected with said intermediate shaft, a direct drive sun gear smaller than the sun gear on said intermediate shaft, a pinion integral with said cluster planet gear means meshing with said direct drive sun gear, and an overrunning clutch between said direct drive sun gear and driving shaft for preventing said direct drive sun gear from rotating faster than said driving shaft, there also being an overrunning clutch between said driven shaft and said brake means permitting rotation of said driven shaft in its forward direction when the brake means is actuated, but preventing rotation thereof in the opposite direction when said brake means is actuated, and there also being an overrunning clutch between said driven shaft and said driving shaft to prevent the driven shaft from overrunning the driving shaft.

8. In combination in a transmission having driving and driven shafts: an intermediate shaft coaxial with said driving and driven shafts, a sun gear on said intermediate shaft and a larger sun gear on said driven shaft, cluster planet gear means meshing with said sun gears, a frame rotatable about the axis of said shafts rotatably supporting said cluster planet gear means, means selectively operable for preventing rotation of said frame in a direction opposite to the forward direction of said driven shaft while permitting rotation of said frame in the forward direction of said driven shaft, a direct drive sun gear smaller than the sun gear on said driven shaft and a pinion integral with said cluster planet gear means and meshing with said direct drive sun gear, an overrunning clutch between said direct drive sun gear and the drive shaft to prevent the direct drive sun gear from overrunning the drive shaft, and brake means selectively operable for locking said frame against rotation in either direction.

9. In combination in a transmission having driving and driven shafts, a pair of intermediate shafts, sun gears of different sizes on said intermediate shafts and a sun gear of a still larger size on said driven shaft, said shafts being coaxial, cluster planet gear means meshing with said sun gears, a frame rotatable about the axis of said shafts rotatably supporting said cluster planet gear means, means for selectively locking said frame against rotation in a direction opposite to that of said driving shaft while permitting rotation of the frame in the direction of rotation of said driving shaft, a fluid coupling having an impeller connected with the said drive shaft, a first runner connected with the one of said intermediate shafts having the smaller sun gear thereon and a second runner connected with the other of said intermediate shafts having the larger sun gear thereon, means for selectively coupling said impeller with the first runner for low drive ratio of the transmission and with the second runner for a higher drive ratio of the transmission, a direct drive sun gear intermediate the size of the sun gears on said intermediate shafts and a pinion integral with said cluster planet gear means and meshing with said direct drive sun gear, and means for preventing said direct drive sun gear from rotating at a speed faster than said drive shaft.

10. In combination in a transmission having driving and driven shafts, a pair of intermediate shafts, sun gears of different sizes on said intermediate shafts and a sun gear of a still larger size on said driven shaft, said shafts being coaxial, cluster planet gear means meshing with said sun gears, a frame rotatable about the axis of said shafts rotatably supporting said cluster planet gear means, means for selectively locking said frame against rotation in a direction opposite to that of said driving shaft, while permitting rotation of the frame in the forward direction of rotation of said driving shaft, a fluid coupling having an impeller connected with the said drive shaft, a first runner connected with the one of said intermediate shafts having the smaller sun gear thereon and a second runner connected with the other of said intermediate shafts having the larger sun gear thereon, means for selectively coupling said impeller with the first runner for low drive ratio of the transmission and with the second runner for a higher drive ratio of the transmission, a direct drive sun gear intermediate the size of the sun gears on said intermediate shafts and a pinion integral with said cluster planet gear means and meshing with said direct drive sun gear, means for preventing said direct drive sun gear from rotating at a speed faster than said drive shaft, and brake means selectively operable for holding said second runner and the intermediate shaft and larger sun gear connected therewith against rotation for reverse operation of said transmission.

11. In combination in a transmission having driving and driven shafts, a pair of intermediate shafts, sun gears of different sizes on said intermediate shafts and a sun gear of a still larger size on said driven shaft, said shafts being coaxial, cluster planet gear means meshing with said sun gears, a frame rotatable about the axis of said shafts rotatably supporting said cluster planet gear means, means for selectively locking said frame against rotation in a direction opposite to that of said driving shaft, while permitting rotation of the frame in the same direction as said driving shaft, a fluid coupling having an impeller connected with the said drive shaft, a first runner connected with the one of said intermediate shafts having the smaller sun gear thereon and a second runner connected with the other of said intermediate shafts having the larger sun gear thereon, means for selectively coupling said impeller with the first runner for low drive ratio of the transmission and with the second runner for a higher drive ratio of the transmission, a direct drive sun gear intermediate the size of the sun gears on said intermediate shafts and a pinion integral with said cluster planet gear means and meshing with said direct drive sun gear, means for preventing said direct drive sun gear from rotating at a speed faster than said drive shaft, brake means selectively operable for holding said second runner and the intermediate shaft and larger sun gear connected therewith against rotation for reverse operation of said transmission, and means for releasing said frame for rotation in the reverse direction when said brake means is actuated.

12. In combination in a transmission having driving and driven shafts, a pair of intermediate shafts, sun gears of different sizes on said intermediate shafts and a sun gear of a still larger size on said driven shafts, said shafts being coaxial, cluster planet gear means meshing with said sun gears, a frame rotatable about the axis of said shafts rotatably supporting said cluster planet gear means, means for selectively locking said frame against rotation in a direction opposite to that of said driving shaft, while permitting rotation of said frame in the same direction as said driving shaft, a fluid coupling having an impeller connected with the said drive shaft, a first runner connected with the one of said intermediate shafts having the smaller sun gear thereon and a second runner connected with the other of said intermediate shafts having the larger sun gear thereon, means for selectively coupling said impeller with the first runner for low drive ratio of the transmission and with the second runner for a higher drive ratio of the transmission, a direct drive sun gear intermediate the size of the sun gears on said intermediate shafts and a pinion integral with said cluster planet gear means and meshing with said direct drive sun gear, means for preventing said direct drive sun gear from rotating at a speed faster than said drive shaft, brake means selectively operable for holding said second runner and the intermediate shaft and larger sun gear connected therewith against rotation for reverse operation of said transmission, and means for releasing said frame for rotation in the reverse direction when said brake means is actuated, there also being brake means for holding said frame against rotation to lock the transmission in low gear.

13. In combination in a transmission having driving and driven shafts, a pair of intermediate shafts, sun gears of different sizes on said intermediate shafts and a sun gear of a still larger size on said driven shaft, said shafts being coaxial, cluster planet gear means meshing with said sun gears, a frame rotatable about the axis of said shafts rotatably supporting said cluster planet gear means, means for selectively locking said frame against rotation in a direction opposite to that of said driving shaft, while permitting rotation of said frame in the same direction as said driving shaft, a fluid coupling having an impeller connected with the said drive shaft, a first runner connected with the one of said intermediate shafts having the smaller sun gear thereon and a second runner connected with the other of said intermediate shafts having the larger sun gear thereon, means for selectively coupling said impeller with the first runner for low drive ratio of the transmission and with the second runner for a higher drive ratio of the transmission, a direct drive sun gear intermediate the size of the sun gears on said intermediate shafts and a pinion integral with said cluster planet gear means and meshing with said direct drive sun gear, means for preventing said direct drive sun gear from rotating at a speed faster than said drive shaft, other brake means selectively operable for holding said second runner and the intermediate shaft and larger sun gear connected therewith against rotation for reverse operation of said transmission, means for releasing said frame for rotation in the reverse direction when said brake means is actuated, there also being brake means for holding said frame against rotation to lock the transmission in low gear, and another overrunning clutch between said driving and driven shafts preventing the driven shaft from overrunning the driving shaft.

References Cited in the file of this patent

UNITED STATES PATENTS

| Number | Name | Date |
|---|---|---|
| 1,607,986 | Jones et al. | Nov. 23, 1926 |
| 1,888,191 | Wilson | Nov. 15, 1932 |
| 2,100,191 | Lapsley | Nov. 23, 1937 |
| 2,117,673 | Lysholm | May 17, 1938 |
| 2,149,117 | Dodge | Feb. 28, 1939 |
| 2,182,386 | Patterson | Dec. 5, 1939 |
| 2,186,025 | Jandasek | Jan. 9, 1940 |
| 2,203,177 | Patterson | June 4, 1940 |
| 2,238,748 | Patterson | Apr. 15, 1941 |
| 2,316,390 | Bierman | Apr. 13, 1943 |
| 2,318,660 | Barrett | May 11, 1943 |
| 2,326,994 | Duffield | Aug. 17, 1943 |
| 2,346,365 | Duffield | Apr. 11, 1944 |
| 2,360,258 | Murray | Oct. 10, 1944 |
| 2,360,259 | Murray | Oct. 10, 1944 |
| 2,371,574 | Swennes | Mar. 13, 1945 |
| 2,408,008 | Tipton | Sept. 24, 1946 |
| 2,498,797 | Duffield | Feb. 28, 1950 |
| 2,568,007 | Jandasek | Sept. 18, 1951 |
| 2,584,905 | McFarland | Feb. 2, 1952 |
| 2,598,501 | Burnett | May 27, 1952 |
| 2,600,592 | Watson | June 17, 1952 |
| 2,618,174 | Clifton | Nov. 18, 1952 |